United States Patent
Matsumoto

(10) Patent No.: US 12,466,263 B2
(45) Date of Patent: Nov. 11, 2025

(54) POWER GENERATION CONTROL SYSTEM, POWER GENERATION CONTROL METHOD, AND AIRCRAFT

(71) Applicant: HONDA MOTOR CO., LTD., Tokyo (JP)

(72) Inventor: Takeshi Matsumoto, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 147 days.

(21) Appl. No.: 18/186,223

(22) Filed: Mar. 20, 2023

(65) Prior Publication Data

US 2023/0303259 A1 Sep. 28, 2023

(30) Foreign Application Priority Data

Mar. 25, 2022 (JP) ................... 2022-050947

(51) Int. Cl.
*B60L 3/00* (2019.01)
*B64C 29/00* (2006.01)
(Continued)

(52) U.S. Cl.
CPC ........ *B60L 3/0046* (2013.01); *B64C 29/0025* (2013.01); *B64D 27/24* (2013.01);
(Continued)

(58) Field of Classification Search
CPC ...... B60L 3/0046; B60L 3/0092; B60L 50/10; B60L 50/61; B60L 58/12; B60L 2200/10;
(Continued)

(56) References Cited

U.S. PATENT DOCUMENTS 4,345,327 A * 8/1982 Thuy ................. G05B 9/03
318/564
6,293,491 B1 9/2001 Wobben
(Continued)

FOREIGN PATENT DOCUMENTS

| JP | 2013230812 A | 11/2013 |
| JP | 2019077361 A | 5/2019 |
| JP | 2020152370 A | 9/2020 |

OTHER PUBLICATIONS

Office Action issued for counterpart Japanese Application No. 2022-050947, transmitted from the Japanese Patent Office on Aug. 26, 2025 (drafted on Aug. 21, 2025).

*Primary Examiner* — Jason H Duger

(57) ABSTRACT

A power generation control system 70 according to the present embodiment includes power generation devices 40a and 40b configured to generate electrical power by using engines 44a and 44b based on a target power generation amount, and to supply the generated electrical power to a load (i.e., rotors 20 and 29), flight controllers 92a and 92b configured to decide a target power feed amount, which represents an electrical power amount to be supplied to the load, based on a state of the load, and control sections 91a and 91b configured to control the power generation devices by evaluating reliability of the target power generation amount, selecting a calculation method of the target power generation amount based on a result of the evaluation, and calculating the target power generation amount by using a target power feed amount decided by the flight controllers according to the calculation method.

17 Claims, 8 Drawing Sheets

(51) Int. Cl.
- *B64D 27/02* (2006.01)
- *B64D 27/24* (2024.01)
- *B64D 27/34* (2024.01)
- *B64D 27/357* (2024.01)
- *B64D 31/16* (2024.01)
- *G05B 9/03* (2006.01)
- *H02J 7/14* (2006.01)

(52) U.S. Cl.
CPC ........... *B64D 27/34* (2024.01); *B64D 27/357* (2024.01); *B64D 31/16* (2024.01); *G05B 9/03* (2013.01); *H02J 7/1423* (2013.01); *H02J 7/143* (2020.01); *B60L 2200/10* (2013.01); *B64D 27/026* (2024.01); *H02J 2310/44* (2020.01)

(58) Field of Classification Search
CPC .. B64C 29/0025; B64D 27/24; B64D 27/026; B64D 27/34; B64D 27/357; B64D 31/16; B64D 2221/00; H02J 7/0063; H02J 7/1423; H02J 2310/44; H02J 7/143; G05B 9/03
See application file for complete search history.

(56) References Cited

U.S. PATENT DOCUMENTS

| | | | |
|---|---|---|---|
| 8,127,180 B2* | 2/2012 | Baleani | H04L 1/22 |
| | | | 714/48 |
| 9,932,108 B1 | 4/2018 | Viele | |
| 12,084,172 B2* | 9/2024 | Kirsch | B64C 27/08 |
| 2003/0145256 A1* | 7/2003 | Jehlicka | H02J 7/1423 |
| | | | 714/48 |
| 2011/0178648 A1* | 7/2011 | Calvignac | F02C 7/32 |
| | | | 700/291 |
| 2016/0325629 A1* | 11/2016 | Siegel | B64D 27/33 |
| 2016/0355275 A1* | 12/2016 | Seger | H02P 29/0241 |
| 2018/0201384 A1* | 7/2018 | Barth | B64D 31/06 |
| 2020/0156805 A1* | 5/2020 | Andrus | F02D 41/3082 |
| 2021/0171212 A1* | 6/2021 | Keller | B64D 31/18 |
| 2021/0370786 A1 | 12/2021 | Vinson | |
| 2022/0009615 A1* | 1/2022 | Mark | B64D 35/023 |
| 2022/0144443 A1* | 5/2022 | Lee | B64D 27/02 |
| 2022/0243670 A1* | 8/2022 | Park | B60L 3/0046 |

* cited by examiner

| RELIABILITY EVALUATION (STATE OF CONTROL SECTIONS 91a and 91b) | CONTROL MODE | TARGET POWER GENERATION AMOUNT |
|---|---|---|
| BOTH ARE NORMAL | NORMAL CONTROL MODE | TARGET POWER FEED AMOUNT + TARGET CHARGE AMOUNT |
| ONE IS ABNORMAL | FAIL CONTROL MODE 1 | TARGET POWER FEED AMOUNT + TARGET CHARGE AMOUNT or REFERENCE POWER GENERATION AMOUNT |
| BOTH ARE ABNORMAL | FAIL CONTROL MODE 2 | REFERENCE POWER GENERATION AMOUNT |
| BOTH ARE ABNORMAL, AND CHARGE AMOUNT OF BATTERY IS LESS THAN CERTAIN AMOUNT | FAIL CONTROL MODE 3 | MAXIMUM POWER GENERATION AMOUNT |

FIG.4

POWER GENERATION CONTROL SYSTEM, POWER GENERATION CONTROL METHOD, AND AIRCRAFT

CROSS-REFERENCE TO RELATED APPLICATIONS

The contents of the following Japanese patent application(s) are incorporated herein by reference:
NO. 2022-050947 filed in JP on Mar. 25, 2022

BACKGROUND

1. Technical Field

The present invention relates to a power generation control system, a power generation control method, and an aircraft.

2. Related Art

Conventionally, known is a vertical take-off and landing aircraft (also referred to as VTOL aircraft or simply aircraft) that takes off and lands by moving up and down in a vertical direction by a plurality of take-off and landing (VTOL) rotors arranged on the left and right sides of a fuselage, and flies in a horizontal direction by a cruise rotor arranged at the rear of the fuselage. Such an aircraft charges a battery with electrical power generated by a power generation device using an engine, and operates a plurality of rotors to fly by using the electrical power charged in the battery. Generally, it is configured to control the power generation device by transmitting a target power generation amount from a control device to the power generation device via a communication bus.

Patent Literature 1: Specification of US Patent Application Publication No. 2021/370786

BRIEF DESCRIPTION OF THE DRAWINGS

FIG. 4 illustrates a correspondence among reliability evaluation, selection of a control mode, and a calculation method of a target power generation amount.

DESCRIPTION OF EXEMPLARY EMBODIMENTS

Hereinafter, (some) embodiment(s) of the present invention will be described. The embodiment(s) do(es) not limit the invention according to the claims. In addition, not all of the combinations of features described in the embodiments are essential to the solution of the invention.

Figure 1:
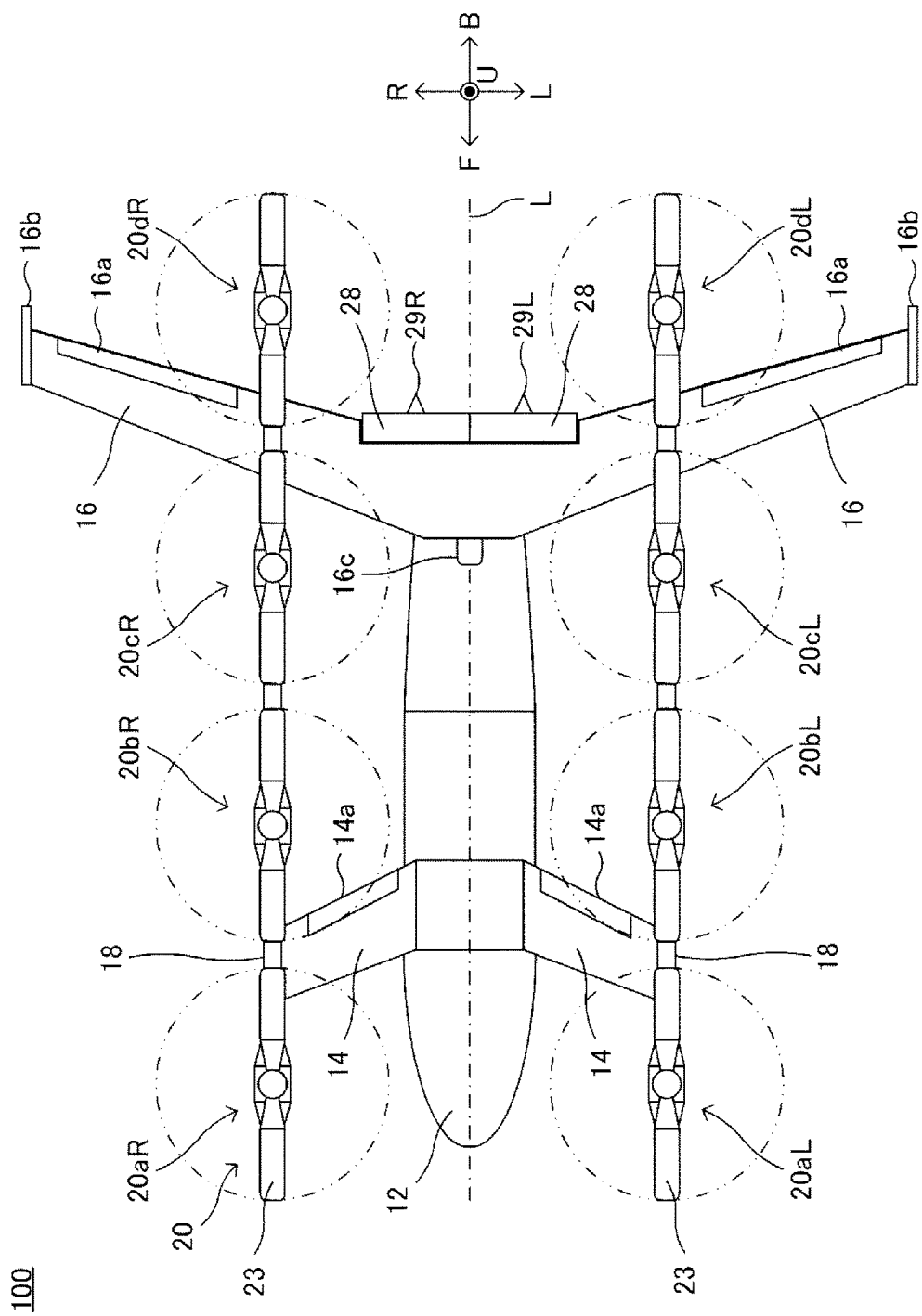
FIG. 1 illustrates a configuration of an aircraft according to the present embodiment in a top view.

FIG. 1 illustrates a configuration of an aircraft 100 according to the present embodiment in a top view. The aircraft 100 is a vertical take-off and landing aircraft that includes a rotor having an electric motor serving as a drive source, takes off and lands in a vertical direction by generating a propulsive force with a take-off and landing rotor (also referred to as VTOL rotor) 20, and flies in a horizontal direction by generating a propulsive force with a cruise rotor 29, and is also a hybrid machine that can operate the electric motor by using electrical power generated by power generation devices 40a and 40b (engines 44a and 44b and motor generators 42a and 42b) and electrical power charged in a battery 32 and can charge the battery 32 by the engines 44a and 44b.

The aircraft 100 according to the present embodiment is configured to be able to stably feed power to a plurality of rotors 20 and 29 without shortage in power generation amount even when control sections 91a and 91b, a communication line, etc. fail, and the power generation devices 40a and 40b cannot receive a target power generation amount from the control sections 91a and 91b, and includes a fuselage 12, a front wing 14, a rear wing 16, two booms 18, eight VTOL rotors 20, two cruise rotors 29, a high-voltage system 40, a communication system 49, and a power generation control system 70.

The fuselage 12 is a structure configured to provide a space for boarding a crew and a passenger and for loading cargo and the like, and to store devices such as a battery 32, motor generators 42a and 42b, and engines 44a and 44b. The fuselage 12 is symmetric relative to a central axis L, and has a shape that extends in a front-back direction parallel to the central axis L and is thin in the left-right direction orthogonal to the central axis L in the horizontal plane. Here, the direction parallel to the central axis L is defined as the front-back direction, in which the left side of the drawing and the right side of the drawing are respectively the front (F) and back (B), and the direction orthogonal to the central axis L in the horizontal plane is defined as the width direction (or the left-right direction), in which the upper side of the drawing and the lower side of the drawing are respectively the right (R) and left (L). In addition, the vertical direction is orthogonal to each of the front-back direction and the width direction, in which the upward and downward in the vertical direction are also respectively referred to as upper (U) and lower (L). The fuselage 12 has a front end with a round curvature in a top view, and a rear end parallel to the width direction that is tapered to some extent relative to the barrel portion.

The front wing 14 is a wing body provided to extend laterally from the fuselage 12, and configured to generate lift during cruise, i.e., by moving forward, and functions as a canard of the aircraft 100. The front wing 14 has a V-shape with two wing bodies respectively extending from the center portion to the front-left direction and the front-right direction, and is fixed on the upper portion of the front side of the barrel portion of the fuselage 12 at the center portion with the opening of the V-shaping facing toward the front. The front wing 14 includes an elevator 14a arranged in a rear edge on each of the two wing bodies.

The rear wing 16 is a wing body provided to extend laterally from the fuselage 12, and configured to generate lift during cruise, i.e., by moving forward, and functions as a swept-back wing configured to reduce air resistance. The rear wing 16 has a V-shape in which two wing bodies extend from a center portion to the left rear and the right rear, respectively, and is fixed at the center portion on the upper portion of the rear end of the fuselage 12 via a pylon 16c with the V-shaped opening being directed toward the rear. The rear wing 16 includes an elevon 16a arranged in a rear edge on each of the two wing bodies and vertical tail wings 16b arranged at tips of the wings.

Here, a wing area of the rear wing 16 is greater than that of the front wing 14, and a wing width of the rear wing 16 is wider than that of the front wing. In this manner, the lift generated by the rear wing 16 by moving forward is greater than the lift generated by the front wing 14, and the rear wing 16 functions as a main wing of the aircraft 100. Note that, the wing areas, the lengths or the like of the front wing 14 and the rear wing 16 may be decided based on the balance of the lift generated by each wing, the position of the center of gravity, the posture of the aircraft body during cruise, and the like.

The two booms 18 are structures that are each spaced apart from the fuselage 12 in the left-right direction and supported by the front wing 14 and the rear wing 16, and perform a function of supporting or storing each component of the VTOL rotor 20. The two booms 18 each have a cylindrical shape extending in the front-back direction in a top view and a wing-shaped cross section with the upper side having a round curvature and the lower side tapered in a front view, and are paired to be arranged symmetrically with respect to the fuselage 12 (i.e., the central axis L). Note that, the two booms 18 may be formed to extend in the front-back direction and to have an arch-shape curvature in the width direction. The two booms 18 each have a front end positioned ahead of the front wing 14, are each supported on a tip end of the front wing 14 by a front barrel portion (between the two VTOL rotors 20aL and 20bL on the front side and between the two VTOL rotors 20aR and 20bR on the front side), each have a rear end positioned behind the rear wing 16 and are each supported on the rear wing 16 by a rear barrel portion (between the two VTOL rotors 20cL and 20dL on the rear side and the two VTOL rotors 20cR and 20dR on the rear side).

The eight VTOL rotors 20 (20aL to 20dL and 20aR to 20dR) are examples of a load supplied with electrical power generated by the power generation devices 40a and 40b, and are a propulsion system supported by the two booms 18 and configured to generate a propulsive force in the vertical direction during takeoff and landing. Among the eight VTOL rotors 20, the four VTOL rotors 20aL to 20dL are supported at substantially equal intervals on the left boom 18, and the remaining four VTOL rotors 20aR to 20dR are supported at substantially equal intervals on the right boom 18. Here, the VTOL rotors 20aL to 20dL on the left are arranged such that the VTOL rotor 20aL is positioned at the forefront, the two VTOL rotors 20bL and 20cL are positioned before and behind between the front wing 14 and the rear wing 16, respectively, and the VTOL rotor 20dL is positioned at the rearmost. Similarly, the VTOL rotors 20aR to 20dR on the right side are arranged such that the VTOL rotor 20aR is positioned at the forefront, the two VTOL rotors 20bR and 20cR are positioned before and behind between the front wing 14 and the rear wing 16, respectively, and the VTOL rotor 20dR is positioned at the rearmost. Among the VTOL rotors 20aL to 20dL on the left side and the four VTOL rotors 20aR to 20dR on the right side, the two left and right VTOL rotors 20aL and 20aR, VTOL rotors 20bL and 20bR, VTOL rotors 20cL and 20cR, and VTOL rotors 20dL and 20dR, which are respectively located at the same position in the front-back direction, are paired, respectively, and are controlled to rotate in opposite directions to each other.

Note that, unless otherwise specified, each of the eight VTOL rotors 20aL to 20dL and 20aR to 20dR is simply referred to as a VTOL rotor 20.

Figure 2:
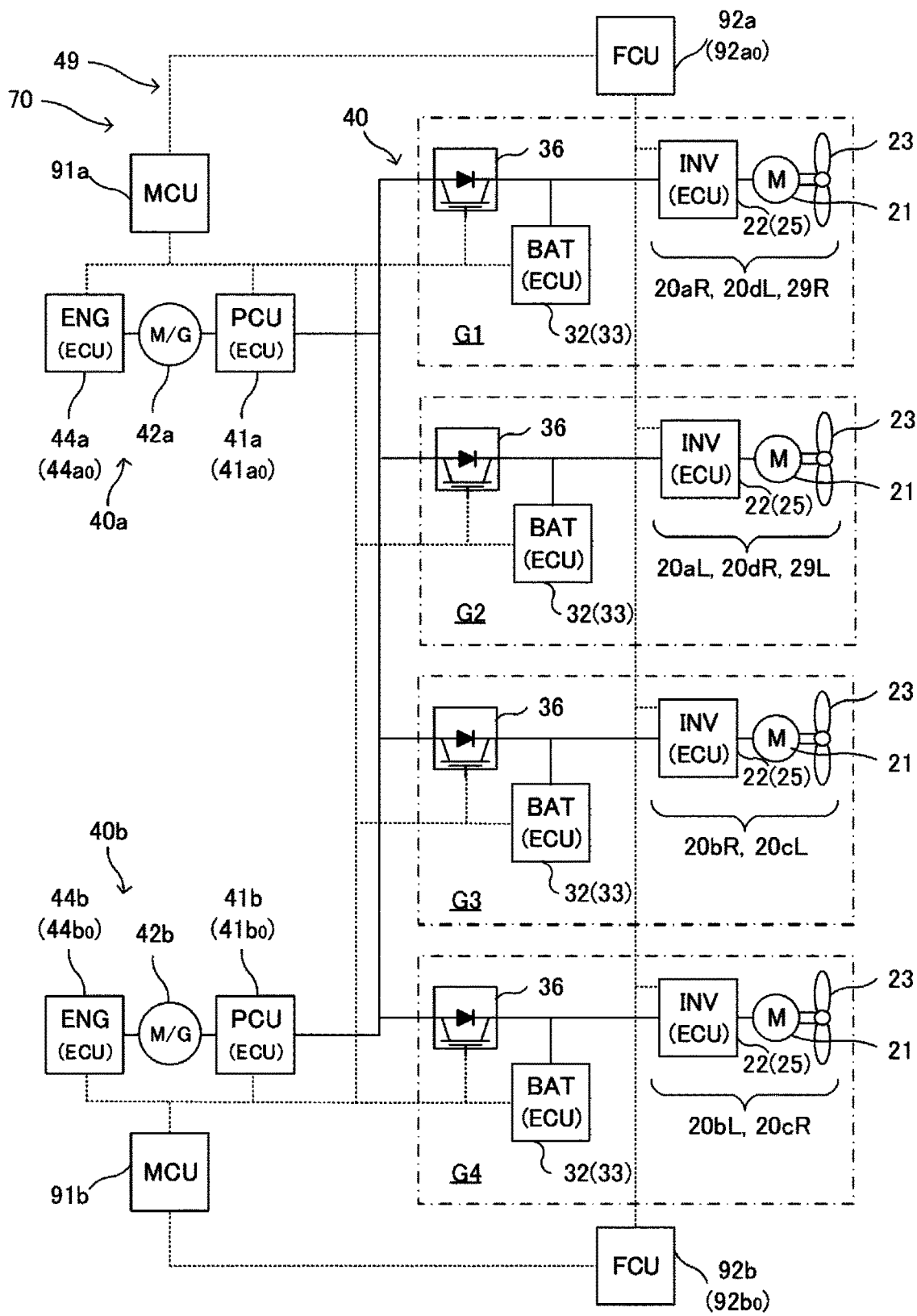
FIG. 2 illustrates a configuration of a high-voltage system and a configuration of a communication system.

The VTOL rotor 20 has one or more blades 23, a motor 21, an inverter 22, and an ECU 25 (refer to FIG. 2).

The one or more blades 23 are blade-shaped members that are supported on the boom 18 and configured to rotate to generate a propulsive force in the vertical direction. In the present embodiment, the number of blades 23 is two, but may be any number including one or three or more. The one or more blades 23 are supported at positions higher than the front wing 14 and the rear wing 16. Note that, in FIG. 1, the plane of rotation of the one or more blades 23 of each VTOL rotor 20 is illustrated by using two-dotted lines.

The motor 21 is an electric motor that has a rotating shaft (not shown) directed in the upper-lower direction and is configured to rotate the blade 23 fixed to the motor 21 via a transmission (not shown) for converting the number of rotations of the rotating shaft. The motor 21 is accommodated in the boom 18.

The inverter 22 is a device configured to receive supply of DC electrical power from the battery 32 via the high-voltage system 40, to convert the DC electrical power into AC electrical power by driving (on/off) a switching element according to a drive signal received from the ECU 25 and to supply the AC electrical power to the motor 21, and is accommodated in the boom 18 together with the motor 21. The inverter 22 can control rotational torque and a rotation speed of the motor 21 respectively by increasing and decreasing the amplitude and frequency of the AC electrical power.

The ECU (electronic control unit) 25 is a unit configured to transmit a drive signal to the inverter 22 to control an operation of the inverter and to modulate an amplitude and a frequency of AC electrical power. In the present embodiment, the ECU 25 is provided to the inverter 22. As an example, the ECU 25 is implemented by a microcontroller, and configured to operate by receiving low-voltage DC electrical power from the battery 32 via a low-voltage system (LVS), and to exhibit a control function by executing a dedicated program stored in a memory.

The two cruise rotors 29 (29L, 29R) are examples of a load supplied with electrical power generated by the power generation devices 40a and 40b, and are a propulsion system supported at the rear end of the fuselage 12 and configured to generate a propulsive force during cruise (refer to FIG. 2). The cruise rotors 29L and 29R are arranged side by side in the left-right direction with respect to the central axis L in a cylindrical duct 28 fixed to the rear end of the fuselage 12, and each have one or more blades 23 supported in the duct 28 and configured to rotate to generate a propulsive force forward, a motor 21 having a rotating shaft directed in the front-back direction and configured to rotate the one or more blades 23 fixed to a tip end via the rotating shaft, an inverter 22 configured to receive DC electrical power supplied from the battery 32, to convert the DC electrical power into AC electrical power and to supply the AC electrical power to the motor 21, and an ECU 25 configured to control an operation of the inverter 22. The inverter 22 can control a rotation speed of the motor 21. These components are each configured similarly to those in the VTOL rotor 20.

Note that, unless otherwise specified, each of the two cruise rotors 29L and 29R is simply referred to as a cruise rotor 29. In addition, unless otherwise specified, the VTOL rotor 20 and the cruise rotor 29 are collectively referred to as rotors 20 and 29.

FIG. 2 illustrates a configuration of a high-voltage system (also referred to as a power distribution system (PDS)) 40 and a configuration of a communication system 49.

The high-voltage system 40 includes two sets of power generation devices 40a and 40b and four group components G1 to G4. Note that, each of these components is connected via an electrical power line (electrical power cable indicated by a solid line).

The two sets of power generation devices 40a and 40b are power sources configured to generate electrical power by using the engines 44a and 44b based on a target power generation amount and to supply the generated electrical power to a load, and each include an engine (ENG) 44a, 44b, a motor generator (M/G) 42a, 42b, and a power control unit (PCU) 41a, 41b.

The engines 44a and 44b are internal combustion engines such as reciprocating engines and gas turbine engines. The engines 44a and 44b are configured to generate rotative power and to output the generated rotative power to the motor generators 42a and 42b, respectively. The engines 44a and 44b are controlled by ECU 44$a_0$ and 44$b_0$ provided thereto, respectively.

The ECUs 44$a_0$ and 44$b_0$ are examples of a control unit, and are units configured to control power generation by operating the engines 44a and 44b based on target power generation amounts received from the control sections 91a and 91b, respectively. As an example, the ECUs 44$a_0$ and 44$b_0$ are each implemented by a microcontroller, and configured to operate by receiving low-voltage DC electrical power from the battery 32 via the low-voltage system, and to exhibit a control function by executing a dedicated program stored in the memory. The power generation control by the ECUs 44$a_0$ and 44$b_0$ will be further described later.

The motor generators 42a and 42b are electric generators that serve as starters when starting the engines 44a and 44b and serve as generators after starting the engines 44a and 44b. Rotating shafts of the motor generators 42a and 42b are connected to output shafts of the engines 44a and 44b, respectively. The motor generators 42a and 42b are configured to receive power of the engines 44a and 44b, to generate electrical power, i.e., AC electrical power (particularly, three-phase AC electrical power), to output the AC electrical power to the PCUs 41a and 41b, and to supply the generated electrical power to the load (i.e., the VTOL rotor 20 and the cruise rotor 29 that generate propulsive forces for flying) via the PCUs 41a and 41b. In addition, when starting the engines 44a and 44b, the motor generators 42a and 42b are configured to receive the AC electrical power to generate rotative power, and to output the rotative power to the engines 44a and 44b, respectively.

The PCUs 41a and 41b are each an electrical power conversion unit configured to convert AC electrical power (particularly, three-phase AC electrical power) input from a primary side into DC electrical power by using an inverter circuit and to output the DC electrical power to a secondary side, and to convert DC electrical power input from the secondary side into AC electrical power (particularly, three-phase AC electrical power) and to output the AC electrical power to the primary side. Primary-side terminals of the PCUs 41a and 41b are connected to the motor generators 42a and 42b, respectively, and secondary-side terminals are connected to each of the four group components G1 to G4. The PCUs 41a and 41b are each configured to be able to convert the AC electrical power output from the motor generators 42a and 42b into DC electrical power and to output the DC electrical power toward each of the four group components G1 to G4, and to convert DC electrical power supplied from the batteries 32 included in the four group components G1 to G4 into AC electrical power and to output the AC electrical power to the motor generators 42a and 42b, respectively. The PCUs 41a and 41b are controlled by the ECU 41$a_0$ and 41$b_0$ provided thereto, respectively.

The ECUs 41$a_0$ and 41$b_0$ are examples of the control unit, and are units configured to control power generation by operating the PCUs 41a and 41b based on the target power generation amounts received from the control sections 91a and 91b, respectively. As an example, the ECUs 41$a_0$ and 41$b_0$ are each implemented by a microcontroller, and configured to operate by receiving low-voltage DC electrical power from the battery 32 via the low-voltage system, and to exhibit a control function by executing a dedicated program stored in the memory. The power generation control by the ECUs 41$a_0$ and 41$b_0$ will be further described later.

Each of the four group components G1 to G4 is an electric component group including any two of the eight VTOL rotors 20 (for the group components G1 to G2, additionally any one of the two cruise rotors 29), and the battery 32 and the switch 36 attached to the rotors. Note that, these components each including the battery 32 are connected via a circuit element such as an electrical power line (an electrical power cable indicated by a solid line), a conductor, and a diode.

The group component G1 includes the VTOL rotors 20aR and 20dL, the cruise rotor 29R, the battery 32, and the switch 36.

As described above, the VTOL rotors 20aR, 20dL, and the cruise rotor 29R each includes the motor 21 configured to rotate the one or more blades 23, and the inverter 22 configured to receive DC electrical power supplied from the battery 32, to convert the DC electrical power into AC electrical power, and to supply the AC electrical power to the motor 21. The three rotors 20 and 29 are connected in parallel to the battery 32. Note that, in FIG. 2, for simplicity, the VTOL rotors 20aR and 20dL and the cruise rotor 29R are shown by one rotor.

The battery 32 is an internal power source configured to store electrical power for starting the engines 44a and 44b and for flying. The battery 32 is configured to store the electrical power supplied by the power generation devices 40a and 40b, and to supply the stored electrical power to the VTOL rotor 20 and the cruise rotor 29 (to the motor 21 via the inverter 22). Here, a state of charge of the battery 32 (in particular, a remaining charge amount or a charging rate) is also referred to as SOC (State of Charge). The battery 32 is connected between the three rotors 20 and 29 and the switch 36. The battery 32 is managed by an ECU 33 provided thereto.

The ECU 33 is a unit configured to manage the state of charge (SOC) of the battery 32. As an example, the ECU 33 is implemented by a microcontroller, and configured to operate by receiving low-voltage DC electrical power from the battery 32 via the low-voltage system, and to exhibit a control function by executing a dedicated program stored in the memory. Here, the state of charge of the battery 32 includes at least a charge amount (remaining charge amount, this is also referred to as SOC) and a discharge amount (discharge electrical power amount). The ECU 33 is configured to detect the state of charge of the battery 32 by any method, such as detecting current output from the battery 32 and calculating an integrated amount of the current, or detecting a potential of an output terminal. A result of the detection is transmitted to the control sections $91a$ and $91b$ via the communication line.

The switch 36 is an element for connecting and disconnecting the group component G1 to and from secondary-side terminals of the PCUs $41a$ and $41b$, and includes, for example, a rectifying element (diode) and a switching element connected in parallel. The rectifying element is an element configured to pass only electrical power from the PCUs $41a$ and $41b$ toward the inside of the group component G1. The switching element is an element configured to short-circuit both ends of the rectifying element, and for example, an element such as an insulated gate bipolar transistor (IGBT) may be used. By turning off the switch 36 (switching element), the DC electrical power output from the PCUs $41a$ and $41b$ can be sent to the battery 32 and the three rotors 20 and 29 via the rectifying element, and by turning on the switch, the DC electrical power can be sent from the battery 32 to the PCUs $41a$ and $41b$ via the switching element.

Note that, since the switch 36 includes the rectifying element, the electrical power can be prevented from being supplied from the battery 32 in any group component among the four group components G1 to G4 to other group components while the VTOL rotor 20 and the cruise rotor 29 are operating.

The group component G2 includes the VTOL rotors $20a$L and $20d$R, the cruise rotor $29$L, the battery 32, and the switch 36. These components are each configured similarly to those in the group component G1. Note that, in FIG. 2, for simplicity, the VTOL rotors $20a$L and $20d$R and the cruise rotor $29$L are shown by one rotor.

The group component G3 includes the VTOL rotors $20b$R and $20c$L, the battery 32, and the switch 36. These components are each configured similarly to those in the group component G1. In FIG. 2, for simplicity, the VTOL rotors $20b$R and $20c$L are shown by one rotor.

The group component G4 includes the VTOL rotors $20b$L and $20c$R, the battery 32, and the switch 36. These components are each configured similarly to those in the group component G1. In FIG. 2, for simplicity, the VTOL rotors $20b$L and $20c$R are shown by one rotor.

Note that, in the aircraft 100 according to the present embodiment, although each of the four group components G1 to G4 is provided with one battery 32, i.e., a total of four batteries are provided, the present invention is not limited thereto, and any number of the batteries 32 may be provided. For example, a total of two batteries 32 may be provided, such as one battery 32 for two of the four group components G1 to G4, and a total of eight batteries 32 may be provided, such as two batteries 32 for each of the group component G1 to G4. The number of group components is not also limited to providing a component for the three rotors, and a component may be provided for two rotors or four rotors. Furthermore, each group component may be provided with one or multiple batteries 32.

The communication system 49 includes flight controllers (FCUs) $92a$ and $92b$, control sections (MCUs) $91a$ and $91b$, two ECUs $44a_0$ and $44b_0$ each connected to each of the two engines $44a$ and $44b$ included in the power generation devices $40a$ and $40b$, two ECUs $41a_0$ and $41b_0$ each connected to each of the two PCUs $41a$ and $41b$, four ECUs 33 each connected to each of the four switches 36 and batteries 32 included in the group components G1 to G4, and ten ECUs 25 each connected to each inverter 22. These are connected in communication with each other via a communication line (communication cable indicated by a dotted line).

The power generation control system 70 includes the flight controllers $92a$ and $92b$, the control sections $91a$ and $91b$, the two ECUs $44a_0$ and $44b_0$, the two ECUs $41a_0$ and $41b_0$, and the four ECUs 33 among the control units included in the communication system 49.

The flight controllers $92a$ and $92b$ are examples of the first and second determination units, and are units each configured to independently control an operation of each component by receiving an operation signal from the crew in the aircraft 100 via an interface $92a$, such as a control stick and a thrust lever, and the like. The flight controllers $92a$ and $92b$ are connected to the control sections $91a$ and $91b$ and the ten ECUs 25 via the communication line, respectively. As an example, the flight controllers $92a$ and $92b$ are each implemented by a microcontroller, and configured to operate by receiving low-voltage DC electrical power from the battery 32 via the low-voltage system, and to exhibit a control function by executing a dedicated program stored in the memory.

For example, when the flight controllers $92a$ and $92b$ receive a command relating to steering of the aircraft 100, a command to take off or cruise, etc. via the interface $92a$, the flight controllers are each configured to independently detect states (number of rotations of the blade 23, etc.) of the VTOL rotor 20 and the cruise rotor 29 (i.e., load) by the ECU 25, to decide a propulsive force (also referred to as a propulsive force command value) required for each state and an electrical power amount (i.e., target power feed amount) required to generate each propulsive force, based on the states, and to transmit the decided propulsive force and electrical power amount to the motor generators $42a$ and $42b$, the PCUs $41a$ and $41b$, and the ECU 33 via the control sections $91a$ and $91b$, thereby causing electrical power necessary for operating the rotors 20 and 29 to be generated. In addition to this, the flight controllers are each configured to transmit the propulsive force command value (or the numbers of rotations of the rotors 20 and 29 required to generate the propulsive force) to the ECU 25 to operate the switching element of the inverter 22, and to convert the DC electrical power output from the PCUs $41a$ and $41b$ or the DC electrical power supplied from the battery 32 into AC electrical power and to output the AC electrical power to the motor 21. In this manner, the motor 21 operates and the blade 23 rotates, so that the VTOL rotor 20 and the cruise rotor 29 can be caused to generate the commanded propulsive force.

The control sections (MCUs) $91a$ and $91b$ are units that collectively control the control units included in the high-voltage system 40, and are configured to control, for example, operations of the switching elements by communicating with the switches 36, operations of the engines $44a$ and $44b$ by transmitting the target power generation amount to the ECUs $44a_0$ and $44b_0$, and operations of the switching elements of the PCUs $41a$ and $41b$ by transmitting the target power generation amount to the ECUs $41a_0$ and $41b_0$, and to detect a state of the battery 32 (particularly, the state of charge) by communicating with the ECU 33. The control sections $91a$ and $91b$ are connected to the engines $44a$ and $44b$, the PCUs $41a$ and $41b$, the four switches 36 and the four ECUs 33 via the communication line, respectively. As an example, the control sections $91a$ and $91b$ are each implemented by a microcontroller, and configured to operate by receiving low-voltage DC electrical power from the battery 32 via the low-voltage system, and to exhibit a control function by executing a dedicated program stored in the memory.

The control sections 91a and 91b are configured to control power generation by the power generation devices 40a and 40b and charging of the battery 32 by evaluating reliability of a target power generation amount, selecting a calculation method of the target power generation amount based on a result of the evaluation, and calculating a target power generation amount and a required charge amount (or target charge amount) by using a target power feed amount decided by the flight controllers 92a and 92b according to the calculation method.

The control section 91a is configured to transmit the calculated target power generation amount, required charge amount, etc. to the control section 91b, and the control section 91b is configured to transmit the calculated target power generation amount, required charge amount, etc. to the control section 91a, so that the control sections verify whether the target power generation amounts, required charge amounts, etc. received by the control sections are not inconsistent with each other (match within pre-determined allowable ranges). In this manner, by redundantly calculating and verifying the target power generation amount, required charge amount, etc., power can be stably fed from the power generation devices 40a and 40b to the rotors 20 and 29 and the rotors can be operated.

In addition, the control section 91a is configured to transmit the target power generation amount, the required charge amount, and the like to the ECU $44b_0$ configured to control the engine 44b constituting the power generation device 40b and the ECU $41b_0$ configured to control the PCU 41b without being limited to transmitting the target power generation amount, the required charge amount, and the like to the ECU $44a_0$ configured to control the engine 44a constituting the power generation device 40a and the ECU $41a_0$ configured to control the PCU 41a. The control section 91b is configured to transmit the target power generation amount, the required charge amount, and the like to the ECU $44a_0$ configured to control the engine 44a constituting the power generation device 40a and the ECU $41a_0$ configured to control the PCU 41a without being limited to transmitting the target power generation amount, the required charge amount, and the like to the ECU $44b_0$ configured to control the engine 44b constituting the power generation device 40b and the ECU $41b_0$ configured to control the PCU 41b. In this manner, by redundantly transmitting the target power generation amount and the required charge amount to the lower-level control units, even when one of the flight controllers 92a and 92b or one of the control sections 91a and 91b fails, the power generation devices 40a and 40b can be stably operated and power can be fed to the rotors 20 and 29, based on the target power generation amount and required charge amount received from the other side.

The two ECUs $44a_0$ and $44b_0$, the two ECUs $41a_0$ and $41b_0$, the four switches 36, the four ECUs 33, and the ten ECUs 25 are configured as described above.

Figure 3:
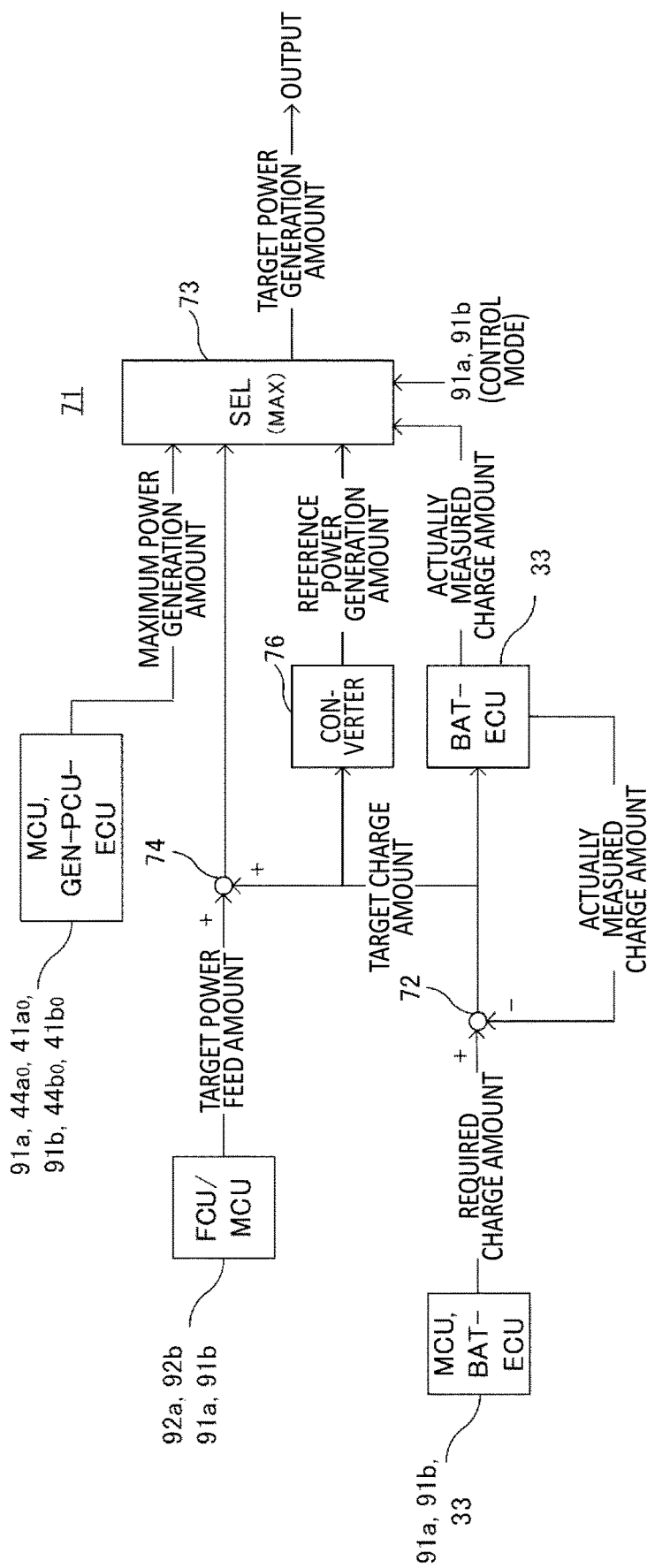
FIG. 3 illustrates a configuration of a logic circuit for calculating a target power generation amount.

FIGS. 3 and 4 each illustrate a configuration of a logic circuit 71 for evaluating and calculating reliability of a target power generation amount, and a correspondence among reliability evaluation, selection of a control mode, and a calculation method of a target power generation amount. The logic circuit 71 may be provided for the control units constituting the power generation control system 70, for example, the control sections 91a and 91b, the ECU $44a_0$ and $44b_0$, and the ECU $41a_0$ and $41b_0$. The logic circuit 71 includes a subtractor 72, an adder 74, a converter 76, and a selector 73.

The subtractor 72 is configured to calculate an electrical power amount (i.e., target charge amount) required for charging for the charge amount of the battery 32 to reach a required charge amount by receiving the required charge amount from the control sections 91a and 91b or the ECU 33 provided for the battery 32, receiving a charge amount (actually measured charge amount) of the battery 32 detected by the ECU 33, and subtracting the received amounts. The calculated target charge amount is output to the adder 74 and the converter 76.

The adder 74 is configured to add a target power feed amount received from the flight controllers 92a and 92b via the control sections 91a and 91b and an output of the subtracter 72, i.e., the target charge amount, and to output the addition result to the selector 73.

Figure 5:
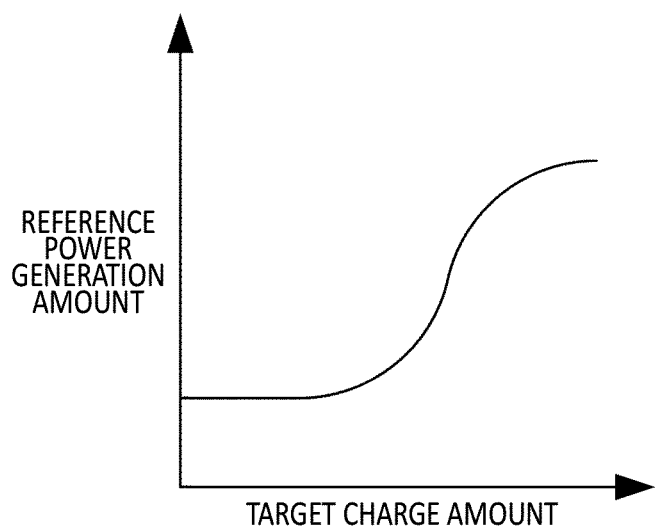
FIG. 5 illustrates an example of a relationship between a reference power generation amount and a target charge amount.

The converter 76 is configured to decide a reference power generation amount, based on the output of the subtractor 72, i.e., the target charge amount (or the state of charge of the battery 32 that is the basis for deciding the target charge amount). The reference power generation amount is a reference for a power generation amount of the power generation device 40a required to store electrical power corresponding to the target charge amount in the battery 32. Here, the power generation amount of the power generation device 40a is controlled by the control sections 91a and 91b to be the same as a sum of a target power feed amount for feeding power to a load and a target charge amount for storing power in the battery 32. Therefore, as illustrated in FIG. 5, even if the target power feed amount is not used, since a large power feed amount is required when the target charge amount is large, the reference power generation amount can be given large, and since the battery 32 is sufficiently charged when the target charge amount is large in the negative direction, the reference power generation amount can be given small. Therefore, the converter 76 is configured to hold in advance a relationship between a target charge amount and a reference power generation amount, to apply a target charge amount to the relationship to derive a reference power generation amount, and to output the reference power generation amount to the selector 73.

Note that, a plurality of relationships between the target charge amount and the reference power generation amount may be determined according to the state of charge (remaining charge amount, temperature, etc.) of the battery 32 and/or a flying state of the aircraft 100, and an appropriate relationship may be selected and used from the relationships. In addition, the discharge electrical power amount of the battery 32 detected by the ECU 33 and/or the target charge amount output from the subtractor 72 may be added to the reference power generation amount.

The selector 73 is configured to receive the output of the adder 74, the output of the converter 76, and the maximum power generation amount, which can be generated by the power generation devices 40a and 40b, from the control sections 91a and 91b, the ECUs $44a_0$ and $44b_0$ or the ECUs $41a_0$ and $41b_0$, and to select, based on control signals (i.e., control mode) from the control sections 91a and 91b and the actually measured charge amount of the battery 32 from the ECU 33, a sum of the target power feed amount and the target charge amount, the larger of the sum of the target power feed amount and the target charge amount and the reference power generation amount, the reference power generation amount, or the maximum power generation amount, and to output the selected amount as the target power generation amount. Note that, the control signals from the control sections 91*a* and 91*b* may be arbitrary signals. In addition, a value of the maximum power generation amount that can be generated by the power generation devices 40*a* and 40*b* may be held in advance by each of the control sections 91*a* and 91*b*, the ECUs 44$a_0$ and 44$b_0$, or the ECUs 41$a_0$ and 41$b_0$.

The selector 73 is configured to evaluate reliability of the target power generation amount and to select a control mode, based on the control signals from the control sections 91*a* and 91*b* and the actually measured charge amount of the battery 32 from the ECU 33. When control signals are input from both the control sections 91*a* and 91*b*, the selector 73 evaluates the reliability as both the control sections 91*a* and 91*b* being functioning normally, selects a normal control mode, and outputs the output of the adder 74 (sum of the target power feed amount and the target charge amount). When a control signal is input from only one of the control sections 91*a* and 91*b*, the selector evaluates the reliability as one of the control sections being functioning normally but the other having failed (abnormal), selects a fail control mode 1, and outputs the larger of the sum of the target power feed amount and target charge amount received from the one control section and the reference power generation amount. When no control signal is input from both the control sections 91*a* and 91*b*, the selector evaluates the reliability as both the control sections 91*a* and 91*b* having failed (abnormal), selects a fail control mode 2 and outputs the reference power generation amount when the actually measured charge amount of the battery 32 is equal to or larger than a certain amount, and selects a fail control mode 3 and outputs the maximum power generation amount when the actually measured charge amount of the battery 32 is less than the certain amount.

In this way, the control sections 91*a* and 91*b* evaluate the reliability of the target power generation amount and select the calculation method (i.e., control mode) of the target power generation amount based on a result of the evaluation, thereby calculating the target power generation amount by using the target power feed amount decided by the flight controllers 92*a* and 92*b* according to an appropriate calculation method corresponding to the reliability of the target power generation amount. As a result, it is possible to appropriately control the power generation device without shortage in power feed even when the reliability is lowered.

In the power generation control system 70 according to the present embodiment, as an example, the selector 73 receives signals from each of the control sections 91*a* and 91*b*, detects that the control sections are functioning or has failed (abnormal), and based on the detection result, evaluates the reliability of the target power generation amounts that the control sections output. Here, the failure of the control sections 91*a* and 91*b* is not limited to failure of the hardware on which they are implemented, and may also include failure of the communication line for sending signals from the control sections. In addition, without being limited to receiving a signal from each of the control sections 91*a* and 91*b*, and instead of or in addition to this, the reliability may be evaluated as the values of the target power generation amounts calculated by each of the control sections 91*a* and 91*b* match each other (or match within a predetermined range). It is also possible to select the normal control mode when the values of the target power generation amounts match each other, and to select the fail control mode 1 when the values do not match.

Figure 6:
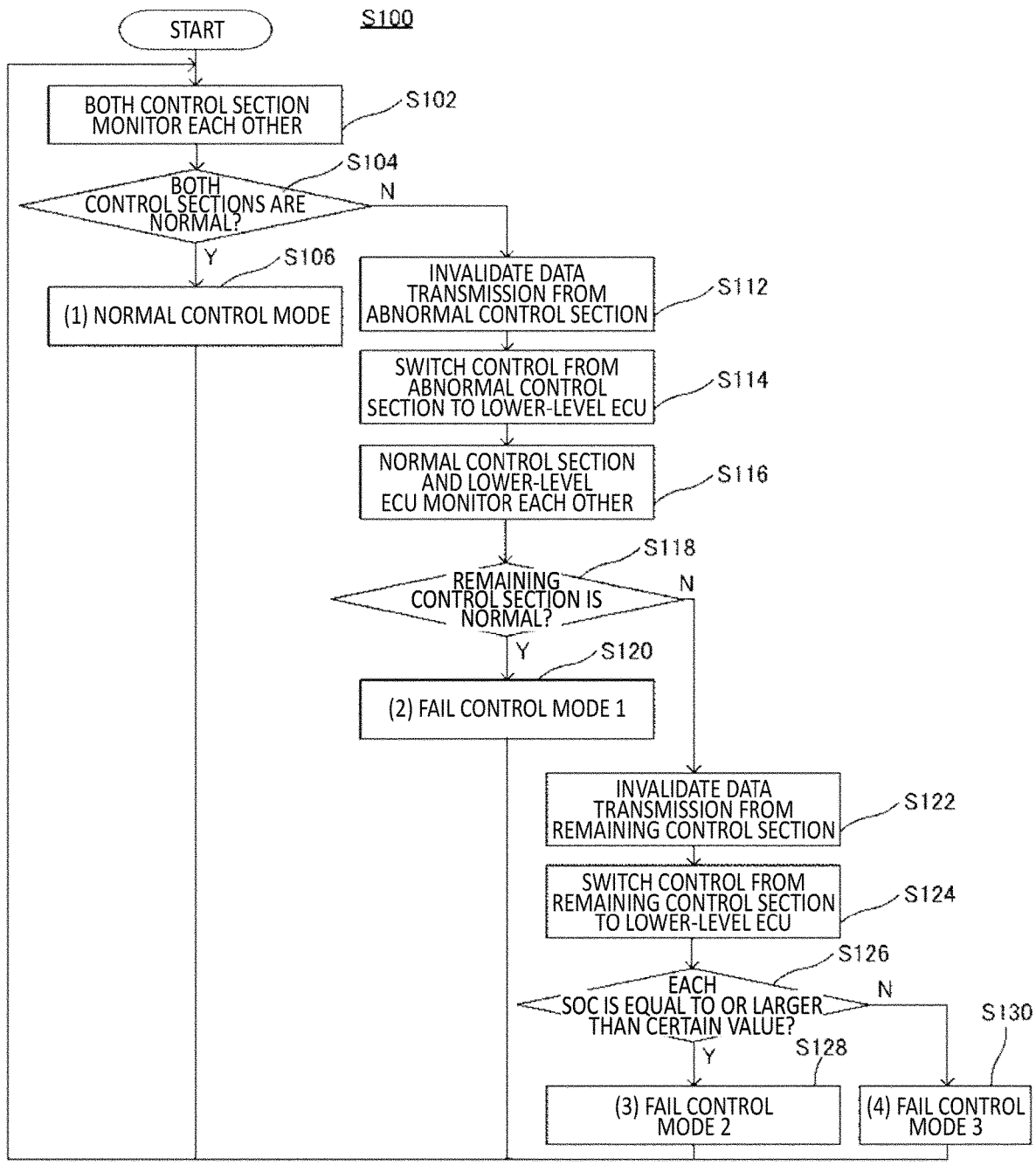
FIG. 6 illustrates a flow of a power generation control method according to the present embodiment.

FIG. 6 illustrates a flow S100 of a power generation control method according to the present embodiment.

In step S102, the control sections 91*a* and 91*b* monitor each other. Here, the control sections 91*a* and 91*b* monitor each other by receiving a target power generation amount (which may be the target power generation amount calculated in the previous step) and other information from the other side.

In step S104, both the control sections 91*a* and 91*b* determine whether the control sections are functioning normally, and each evaluates the reliability of the target power generation amount. Here, the control sections 91*a* and 91*b* determine that the other control section as well as the host control section is functioning normally by receiving the target power generation amount and other information from the other control section in step S102, and determine that the other control section is not functioning normally (abnormal) by not receiving the target power generation amount and other information from the other control section. When the control sections 91*a* and 91*b* evaluate the reliability as both the control sections 91*a* and 91*b* being functioning normally, the control sections proceed to step S106 to select the normal control mode. When the control sections 91*a* and 91*b* evaluate the reliability as one (host control section) of the control sections 91*a* and 91*b* being functioning normally but the other side (other control section) having failed (abnormal), the control sections proceed to step S112 to select the fail control modes 1 to 3.

Note that, the control sections 91*a* and 91*b* may further determine whether both the control sections 91*a* and 91*b* are functioning normally and evaluate the reliability of the target power generation amount, depending on whether the value of the target power generation amount calculated by the host control section matches the value of the target power generation amount received from the other control section (matches within a predetermined allowable range).

In step S106, the control sections 91*a* and 91*b* control the power generation devices 40*a* and 40*b* in the normal control mode. That is, the control sections select a calculation method in the normal control mode, calculate a target power generation amount from the sum of the target power feed amount and the target charge amount by using the calculation method (by the logic circuit 71 described above), and transmit the target power generation amount to the ECUs 41$a_0$ and 41$b_0$ and the ECUs 44$a_0$ and 44$b_0$. The ECUs 41$a_0$ and 41$b_0$ and the ECUs 44$a_0$ and 44$b_0$ determine that the control mode is the normal control mode by receiving the target power generation amounts from each of the control sections 91*a* and 91*b*, operate the power generation devices 40*a* and 40*b* (engines 44*a* and 44*b* and PCUs 41*a* and 41*b*) according to the received target power generation amounts, and feed operating electrical power to the rotors 20 and 29 while supplying charging electrical power to the battery 32.

In this manner, the ECUs 41$a_0$ and 41$b_0$ and the ECUs 44$a_0$ and 44$b_0$, by redundantly receiving the target power generation amounts from each of the control sections 91*a* and 91*b*, can operate the power generation devices 40*a* and 40*b* (engines 44*a* and 44*b* and PCUs 41*a* and 41*b*) according to the target power generation amounts, thereby feeding the operating electrical power to the rotors 20 and 29 while supplying the charging electrical power to the battery 32.

In addition, in the normal control mode, the sum of the target power feed amount and the target charge amount is set as the target power generation amount, so that it is possible to stably generate the target power feed amount required to be fed to the rotors 20 and 29 (load) and the target charge amount to be charged to the battery 32 so as to generate the necessary propulsive force.

When step S106 is completed, the processing returns to step S102.

In step S112, the normally functioning control section of the control sections 91a and 91b invalidates data transmission from the control section determined as being abnormal in step S104. The normally functioning control section causes data transmitted from the control section determined as being abnormal not to be received or the received data not to be used.

In step S114, the control is switched from the control section determined as being abnormal in step S104 to the lower-level ECU thereof. For example, when it is determined that the control section 91b is abnormal, the control is switched to the lower-level ECUs $41b_0$ and $44b_0$. On the other hand, when it is determined that the control section 91a is abnormal, the control is switched to the lower-level ECUs $41a_0$ and $44a_0$.

In step S116, mutual monitoring is performed between the normal control section and the lower-level ECU switched in step S114. For example, when it is determined that the control section 91b is abnormal, the control section 91a and the lower-level ECU $41b_0$ and $44b_0$ of the control section 91b monitor each other. On the other hand, when it is determined that the control section 91a is abnormal, the control section 91b and the lower-level ECUs $41a_0$ and $44a_0$ of the control section 91a monitor each other. Here, the normal control section and the lower-level ECU to which the control has been switched monitor each other by receiving the target power generation amount (which may be the target power generation amount calculated in the previous step) and other information from the other side.

In step S118, the lower-level ECUs $41a_0$ and $44a_0$ and ECUs $41b_0$ and $44b_0$ determine whether the remaining control section, i.e., the control section not determined as being abnormal in step S104 is functioning normally, and each evaluates the reliability of the target power generation amount. By receiving the target power generation amount and other information from the control section not determined as being abnormal in step S104, i.e., the control section 91a or the control section 91b, the ECUs $41a_0$ and $44a_0$ and the ECUs $41b_0$ and $44b_0$ determine that the corresponding control section is functioning normally. When the ECUs $41a_0$ and $44a_0$ and the ECUs $41b_0$ and $44b_0$ evaluate the reliability as the remaining control section being normally functioning, the ECUs proceed to step S120 to select the fail control mode 1. When the ECUs evaluate the reliability as the remaining control section having also failed (abnormal), the ECUs proceed to step S122 to select the fail control mode 2 or 3.

In step S120, the remaining control section, i.e., the control section 91a or the control section 91b, and the ECUs $41a_0$ and $44a_0$, and ECUs $41b_0$ and $44b_0$ control the power generation devices 40a and 40b in the fail control mode 1. That is, the normal control section selects a calculation method in the fail control mode 1, calculates, by using the calculation method (by the logic circuit 71 described above), a target power generation amount from the larger of the sum of the target power feed amount held by the host control section and the target charge amount calculated from the required charge amount held by the host control section or received from the ECU 33 and the reference electrical power amount decided based on the state of charge (or target charge amount) of the battery 32, and transmits the calculated target power generation amount to the ECUs $41a_0$ and $41b_0$ and ECUs $44a_0$ and $44b_0$. The ECUs $41a_0$ and $41b_0$ and the ECUs $44a_0$ and $44b_0$ determine that the control mode is the fail control mode 1 by receiving the target power generation amount from only one of the control sections 91a and 91b, operate the power generation devices 40a and 40b (engines 44a and 44b and PCUs 41a and 41b) according to the received target power generation amount, and feed the operating electrical power to the rotors 20 and 29 while supplying the charging electrical power to the battery 32.

Note that, the ECUs $41a_0$ and $41b_0$ and the ECUs $44a_0$ and $44b_0$ may compare the target power generation amount calculated by each of the ECUs with the target power generation amount received from the normal control section, and, when the values match each other (or match within a predetermined range), operate the power generation devices 40a, 40b (engines 44a, 44b and PCUs 41a and 41b) according to the value, and feed the operating electrical power to the rotors 20 and 29 while supplying the charging electrical power to the battery 32.

In this manner, the control sections 91a and 91b evaluate the reliability of the target power generation amount by receiving, from the other control section, the target power generation amount calculated by the other control section, so that even when the other control section fails and the target power generation amount cannot be received from the other control section, it is possible to select an appropriate calculation method of a target power generation amount according to the reliability, and to stably control the power generation device, based on the target power generation amount.

In addition, in the fail control mode 1, since one control section fails and the target power generation amount is received from only the other control section, the reliability of the received target power generation amount is low. Therefore, when the reference power generation amount decided based on the target charge amount is large with respect to the sum of the target power feed amount and the target charge amount, it is determined that there is a possibility that electrical power greater than the sum of the target power feed amount and the target charge amount will be used and the reference electrical power amount is used. As a result, it is possible to avoid shortage in power generation by the power generation devices 40a and 40b.

When step S120 is completed, the processing returns to step S102.

In step S122, the ECUs $41a_0$ and $41b_0$ and the ECUs $44a_0$ and $44b_0$ invalidate data transmission for the control section determined as being abnormal in step S118 of the control sections 91a and 91b, in addition to the control section determined as being abnormal in step S104. The ECUs $41a_0$ and $41b_0$ and the ECUs $44a_0$ and $44b_0$ cause data transmitted from the control section determined as being abnormal not to be received or the received data not to be used.

In step S124, the control is switched from the control section determined as being abnormal in step S118 to the lower-level ECU thereof. For example, when it is determined that the control section 91b is abnormal, the control is switched to the lower-level ECUs $41b_0$ and $44b_0$. On the other hand, when it is determined that the control section 91a is abnormal, the control is switched to the lower-level ECUs $41a_0$ and $44a_0$.

In step S126, each of the ECU $41a_0$ and $41b_0$ and ECU $44a_0$ and $44b_0$ determines whether the state of charge (charge amount) of the battery 32 is equal to or larger than a certain amount. The state of charge of the battery 32 is detected by the ECU 33. In addition, the reference amount for determining the charge amount may be determined in advance based on the minimum charge amount to be secured for emergency use, for example, or may be appropriately determined by the flight controllers 92a and 92b or the like. When the ECUs $41a_0$ and $44a_0$ and the ECUs $41b_0$ and $44b_0$ evaluate the reliability as both the control sections 91a and 91b being abnormal and the charge amount of the battery 32 being equal to or larger than the certain amount, the ECUs proceed to step S128 to select the fail control mode 2. When the ECUs evaluate the reliability as both the control sections 91a and 91b being abnormal and the charge amount of the battery 32 being less than the certain amount, the ECUs proceed to step S130 to select the fail control mode 3.

In step S128, the ECUs $41a_0$ and $44a_0$ and ECUs $41b_0$ and $44b_0$ control the power generation devices 40a and 40b in the fail control mode 2. That is, the ECUs select a calculation method in the fail control mode 2, calculate, by using the calculation method (by the logic circuit 71 described above), a target power generation amount from a reference electrical power amount decided based on the state of charge (or target charge amount) of the battery 32, operate the power generation devices 40a and 40b (engines 44a and 44b and PCUs 41a and 41b) according to a value of the target power generation amount, and feed the operating electrical power to the rotors 20 and 29 while supplying the charging electrical power to the battery 32.

In step S130, the ECUs $41a_0$ and $44a_0$ and the ECUs $41b_0$ and $44b_0$ control the power generation devices 40a and 40b in the fail control mode 3. That is, the ECUs select a calculation method in the fail control mode 3, use the held maximum power generation amount as a target power generation amount by using the calculation method (by the logic circuit 71 described above), operate the power generation devices 40a and 40b (engines 44a and 44b and PCUs 41a and 41b) according to a value of the maximum power generation amount, and feed the operating electrical power to the rotors 20 and 29 while supplying the charging electrical power to the battery 32.

In this way, even when both the control sections 91a and 91b fail and the target power generation amounts cannot be received from the control sections, the lower-level ECUs $41a_0$ and $44a_0$ can select an appropriate calculation method of a target power generation amount according to the reliability, and stably control the power generation device, based on the target power generation amount.

Also, in the fail control modes 2 and 3, since the ECUs $41a_0$ and $44a_0$ and the ECUs $41b_0$ and $44b_0$ cannot receive the target power generation amount from any of the control sections 91a and 91b, the ECUs can avoid the shortage in power feed to the load by controlling the power generation devices 40a and 40b by using the reference power generation amount, which can be acquired by the host control unit, or by using the held maximum power generation amount.

When steps S128 and S130 are completed, the processing returns to step S102.

Figure 7:
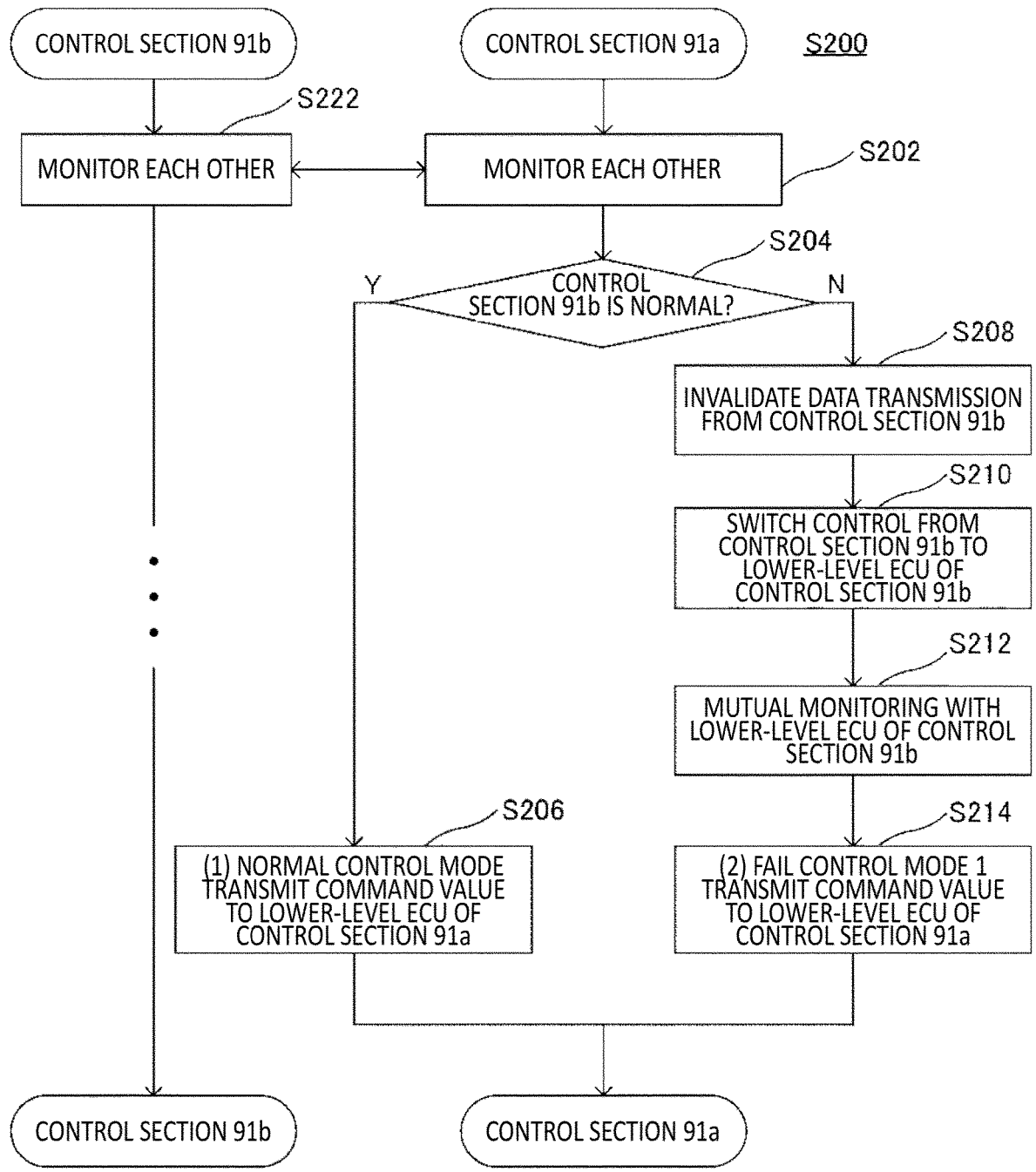
FIG. 7 illustrates a flow of a power generation control method that is executed by a control section according to a modified embodiment.

FIG. 7 illustrates a flow S200 of the power generation control method that is executed by the control section 91a according to a modified embodiment. Note that, although this flow is described as being executed by the control section 91a, the flow can also be similarly executed by the control section 91b. In this case, the control section 91a, the ECUs $41a_0$ and $44a_0$, the power generation device 40a, the PCU 41a, and the engine 44a may be replaced with the control section 91b, the ECUs $41b_0$ and $44b_0$, the power generation device 40b, the PCU 41b, and the engine 44b, respectively. The flow S200 may be executed at regular time intervals.

In step S202, the control section 91a communicates with the control section 91b to monitor each other. Here, the control section 91a monitors the control section 91b by receiving a target power generation amount (which may be a target power generation amount calculated by the control section 91b in the previous step) and other information from the control section 91b. At this time, in step S222, the control section 91b monitors the control section 91a by receiving a target power generation amount (which may be a target power generation amount calculated by the control section 91a in the previous step) and other information from the control section 91a.

In step S202, the control section 91a determines whether the control section 91b is functioning normally, and evaluates the reliability of the target power generation amount. Here, in step S202, the control section 91a determines that the control section 91b is also functioning normally together with the control section 91a by receiving the target power generation amount calculated by the control section 91b and other information from the control section 91b, and determines that the control section 91b is not functioning normally (abnormal) by not receiving the target power generation amount and other information from the control section 91b. When the control section 91a evaluates the reliability as the control section 91a being also functioning normally, the control section proceeds to step S206 to select the normal control mode. When the control section 91a evaluates the reliability as the control section 91b having failed (abnormal), the control section proceeds to step S208 to select the fail control mode 1.

Note that, the control section 91a may further determine whether the control section 91b is functioning normally and evaluate the reliability of the target power generation amount, depending on whether the value of the target power generation amount calculated by the control section 91a matches the value of the target power generation amount received from the control section 91b (matches within a predetermined allowable range).

In step S206, the control section 91a controls the power generation devices 40a and 40b in the normal control mode. That is, the control section selects a calculation method in the normal control mode, calculates, by using the calculation method (by the logic circuit 71 described above), a target power generation amount from the sum of the target power feed amount and the target charge amount, and transmits the target power generation amount to the ECUs $41a_0$ and $44a_0$. The ECUs $41a_0$ and $44a_0$ determine that the control mode is the normal control mode (or fail control mode 1) by receiving the target power generation amount from the control section 91a, operate the power generation device 40a (engine 44a and PCU 41a) according to the received target power generation amount, and feed the operating electrical power to the rotors 20 and 29 while supplying the charging electrical power to the battery 32. Note that, the control section 91a may redundantly transmit the calculated target power generation amount to the ECUs $41b_0$ and $44b_0$.

In this manner, the ECUs $41a_0$ and $44a_0$, by receiving the target power generation amounts whose reliability has been evaluated by the control sections 91a and 91b mutually monitoring each other, can operate the power generation devices 40 (engine 44a and PCU 41a) according to the target power generation amounts, thereby feeding the operating electrical power to the rotors 20 and 29 while stably supplying the charging electrical power to the battery 32.

In addition, in the normal control mode, the sum of the target power feed amount and the target charge amount is set as the target power generation amount, so that it is possible to stably generate the target power feed amount required to be fed to the rotors 20 and 29 (load) and the target charge amount to be charged to the battery 32 so as to generate the necessary propulsive force.

In step S208, the control section 91a invalidates data transmission from the control section 91b. The control section 91a causes data transmitted from the control section 91b not to be received or the received data not to be used.

In step S210, the control is switched from the control section 91b determined as being abnormal to the lower-level ECUs $41b_0$ and $44b_0$ thereof.

In step S212, the control section 91a communicates with the lower-level ECUs $41b_0$ and $44b_0$ to monitor each other, instead of the control section 91b. The control section 91a receives the target power generation amount (which may be the target power generation amount calculated in the previous step) and other information from the ECUs $41b_0$ and $44b_0$ and the ECUs $41b_0$ and $44b_0$ receive the target power generation amount (which may be the target power generation amount calculated in the previous step) and other information from the control section 91a, thereby monitoring each other.

In step S214, the control section 91a controls the power generation devices 40a and 40b in the fail control mode 1. That is, the control section 91a selects a calculation method in the fail control mode 1, calculates, by using the calculation method (by the logic circuit 71 described above), a target power generation amount from the larger of the sum of the target power feed amount held by the host control section and the target charge amount calculated from the required charge amount held by the host control section or received from the ECU 33 and the reference electrical power amount decided based on the state of charge (or target charge amount) of the battery 32, and transmits the calculated target power generation amount to the ECUs $41a_0$ and $44a_0$. The ECUs $41a_0$ and $44a_0$ determine that the control mode is the fail control mode 1 (or normal control mode) by receiving the target power generation amount from the control section 91a, operate the power generation device 40a (engine 44a and PCU 41a) according to the received target power generation amount, and feed the operating electrical power to the rotors 20 and 29 while supplying the charging electrical power to the battery 32.

Note that, the ECUs $41a_0$ and $44a_0$ may compare the target power generation amount calculated by each of the ECUs with the target power generation amount received from the control section 91a, and, when the values match each other (or match within a predetermined range), operate the power generation device 40a (engine 44a and PCU 41a) according to the value, and feed the operating electrical power to the rotors 20 and 29 while supplying the charging electrical power to the battery 32.

In this manner, the control section 91a evaluates the reliability of the target power generation amount by receiving, from the control section 91b, the target power generation amount calculated by the control section 91b, so that even when the control section 91b fails and the target power generation amount cannot be received from the control section 91b, it is possible to select an appropriate calculation method of a target power generation amount according to the reliability, and to stably control the power generation device 40a, based on the target power generation amount.

In addition, in the fail control mode 1, it is possible to avoid the shortage in power generation by the power generation devices 40a and 40b, which is similar to the previous example.

Figure 8:
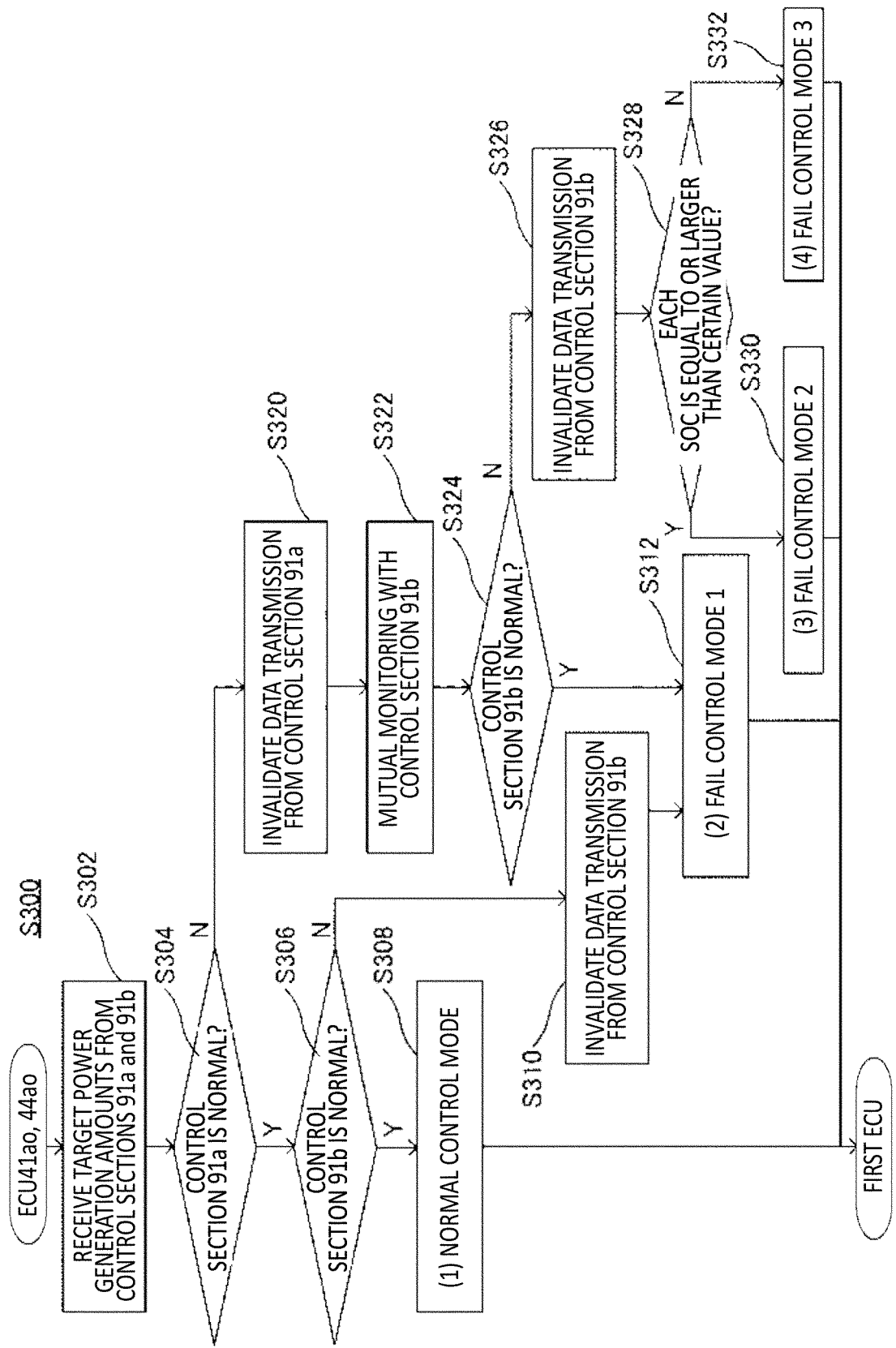
FIG. 8 illustrates a flow of a power generation control method that is executed by a lower-level ECU according to a modified embodiment.

FIG. 8 illustrates a flow S300 of the power generation control method that is executed by the lower-level ECUs $41a_0$ and $44a_0$ according to a modified embodiment. Note that, although this flow is described as being executed by the lower-level ECUs $41a_0$ and $44a_0$, the flow can also be similarly executed by the ECUs $41b_0$ and $44b_0$. In this case, the control section 91a, the ECUs $41a_0$ and $44a_0$, the power generation device 40a, the PCU 41a, and the engine 44a may be replaced with the control section 91b, the ECUs $41b_0$ and $44b_0$, the power generation device 40b, the PCU 41b, and the engine 44b, respectively. The flow S300 may be executed at regular time intervals.

In step S302, the ECUs $41a_0$ and $44a_0$ receive the target power generation amounts and other information from the control sections 91a and 91b.

In step S304, the ECUs $41a_0$ and $44a_0$ determine whether the control section 91a is functioning normally, and evaluate the reliability of the target power generation amount. Here, in step S302, the ECUs $41a_0$ and $44a_0$ determine that the control section 91a is functioning normally by receiving the target power generation amount calculated by the control section 91a and other information from the control section 91a, and determine that the control section 91a is not functioning normally (abnormal) by not receiving the target power generation amount and other information from the control section 91a. When the ECUs $41a_0$ and $44a_0$ determine that the control section 91a is functioning normally, the ECUs proceed to step S306, and when the ECUs determine that the control section 91a has failed (abnormal), the ECUs proceed to step S320.

Note that, the ECUs $41a_0$ and $44a_0$ may further determine whether the control section 91a is functioning normally and evaluate the reliability of the target power generation amount, depending on whether the values of the target power generation amounts calculated by the ECUs $41a_0$ and $44a_0$ match the value of the target power generation amount received from the control section 91a (match within a predetermined allowable range).

In step S306, the ECU $41a_0$ and $44a_0$ determine whether the control section 91b is functioning normally, and evaluate the reliability of the target power generation amount. Here, in step S302, the ECUs $41a_0$ and $44a_0$ determine that the control section 91b is functioning normally by receiving the target power generation amount calculated by the control section 91b and other information from the control section 91b, and determine that the control section 91b is not functioning normally (abnormal) by not receiving the target power generation amount and other information from the control section 91b. When the ECUs $41a_0$ and $44a_0$ determine that the control section 91b is functioning normally, the ECUs proceed to step S308 to select the normal control mode, and when the ECUs determine that the control section 91a has failed (abnormal), the ECUs proceed to step S310 to select the fail control mode 1.

Note that, the ECUs $41a_0$ and $44a_0$ may further determine whether the control section 91b is functioning normally and evaluate the reliability of the target power generation amount, depending on whether the values of the target power generation amounts calculated by the ECUs $41a_0$ and $44a_0$ match the value of the target power generation amount received from the control section 91b (match within a predetermined allowable range).

In step S308, the ECUs $41a_0$ and $44a_0$ control the power generation device 40a in the normal control mode. That is, the ECUs operate the power generation device 40a (engine 44a and PCU 41a) according to the target power generation amount received from the control section 91a, and feed the operating electrical power to the rotors 20 and 29 while supplying the charging electrical power to the battery 32.

In this manner, the ECUs $41a_0$ and $44a_0$, by receiving the target power generation amounts whose reliability has been evaluated by the control sections 91a and 91b being functioning normally, can operate the power generation device 40a (engine 44a and PCU 41a) according to the target power generation amounts, thereby feeding the operating electrical power to the rotors 20 and 29 while stably supplying the charging electrical power to the battery 32.

In addition, in the normal control mode, the sum of the target power feed amount and the target charge amount is set as the target power generation amount, so that it is possible to stably generate the target power feed amount required to be fed to the rotors 20 and 29 (load) and the target charge amount to be charged to the battery 32 so as to generate the necessary propulsive force.

In step S310, the ECUs $41a_0$ and $44a_0$ invalidate data transmission from the control section 91b. The ECUs $41a_0$ and $44a_0$ cause data transmitted from the control section 91b not to be received, or the received data not to be used. When step S310 is completed, the processing proceeds to step S312 to select the fail control mode 1. Step S312 will be described later.

In step S320, the ECUs $41a_0$ and $44a_0$ invalidate data transmission from the control section 91a. The ECUs $41a_0$ and $44a_0$ cause data transmitted from the control section 91a not to be received, or the received data not to be used.

In step S322, the ECUs $41a_0$ and $44a_0$ mutually monitor the normally functioning control section 91b. The ECUs $41a_0$ and $44a_0$ and the control section 91b monitor each other by receiving the target power generation amount (which may be the target power generation amount calculated in the previous step) and other information from the other side.

In step S324, similarly to step S306, the ECUs $41a_0$ and $44a_0$ determine whether the control section 91b is functioning normally, and evaluate the reliability of the target power generation amount. When the ECUs $41a_0$ and $44a_0$ determine that the control section 91b is functioning normally, the ECUs proceed to step S312 to select the fail control mode 1, and when the ECUs determine that the control section 91b has failed (abnormal), the ECUs proceed to step S326 to select the fail control mode 2 or 3.

In step S312, the ECUs $41a_0$ and $44a_0$ control the power generation device 40a in the fail control mode 1. That is, the ECUs $41a_0$ and $44a_0$ determine that the control mode is the fail control mode 1 by receiving the target power generation amount from only one of the control sections 91a and 91b, operate the power generation device 40a (engine 44a and PCU 41a) according to the received target power generation amount, and feed the operating electrical power to the rotors 20 and 29 while supplying the charging electrical power to the battery 32.

Note that, the ECUs $41a_0$ and $44a_0$ may compare the target power generation amount calculated by each of the ECUs with the target power generation amount received from the normal control section, and, when the values match each other (or match within a predetermined range), operate the power generation device 40a (engine 44a and PCU 41a) according to the value, and feed the operating electrical power to the rotors 20 and 29 while supplying the charging electrical power to the battery 32.

In this manner, the control section 91a(91b) evaluates the reliability of the target power generation amount by receiving, from the control section 91b(91a), the target power generation amount calculated by the control section 91b (91a), so that even when the control section 91b(91a) fails and the target power generation amount cannot be received from the control section 91b(91a), it is possible to select an appropriate calculation method of a target power generation amount according to the reliability, and to stably control the power generation device, based on the target power generation amount.

In addition, in the fail control mode 1, since one control section fails and the target power generation amount is received from only the other control section, the reliability of the received target power generation amount is low. Therefore, when the reference power generation amount decided based on the target charge amount is large with respect to the sum of the target power feed amount and the target charge amount, it is determined that there is a possibility that electrical power greater than the sum of the target power feed amount and the target charge amount will be used and the reference electrical power amount is used. As a result, it is possible to avoid shortage in power generation by the power generation devices 40a and 40b.

In step S326, similarly to step S310, the ECUs $41a_0$ and $44a_0$ invalidate data transmission from the control section 91b.

In step S328, the ECUs $41a_0$ and $44a_0$ determine whether the state of charge (charge amount) of the battery 32 is equal to or larger than a certain amount. The state of charge of the battery 32 is detected by the ECU 33. In addition, the reference amount for determining the charge amount may be determined in advance based on the minimum charge amount to be secured for emergency use, for example, or may be appropriately determined by the flight controllers 92a and 92b or the like. When the ECUs $41a_0$ and $44a_0$ evaluate the reliability as the charge amount of the battery 32 being equal to or larger than the certain amount, the ECUs proceed to step S330 to select the fail control mode 2, and when the ECUs evaluate the reliability as the charge amount of the battery 32 being less than the certain amount, the ECUs proceed to step S332 to select the fail control mode 3.

In step S330, the ECUs $41a_0$ and $44a_0$ control the power generation device 40a in the fail control mode 2. That is, the ECUs select a calculation method in the fail control mode 2, calculate, by using the calculation method (by the logic circuit 71 described above), a target power generation amount from a reference electrical power amount decided based on the state of charge (or target charge amount) of the battery 32, operate the power generation device 40a (engine 44a and PCU 41a) according to the value of the target power generation amount, and feed the operating electrical power to the rotors 20 and 29 while supplying the charging electrical power to the battery 32.

In step S332, the ECUs $41a_0$ and $44a_0$ control the power generation device 40a in the fail control mode 3. That is, the ECUs select a calculation method in the fail control mode 3, use the held maximum power generation amount as a target power generation amount by using the calculation method (by the logic circuit 71 described above), operate the power generation device 40a (engine 44a and PCU 41a) according to the value of the maximum power generation amount, and feed the operating electrical power to the rotors 20 and 29 while supplying the charging electrical power to the battery 32.

In this way, even when both the control sections 91a and 91b fail and the target power generation amounts cannot be received from the control sections, the lower-level ECUs $41a_0$ and $44a_0$ can select an appropriate calculation method of a target power generation amount according to the reliability, and stably control the power generation device, based on the target power generation amount.

In addition, in the fail control modes 2 and 3, since the ECUs $41a_0$ and $44a_0$ cannot receive the target power generation amount from any of the control sections 91a and 91b, the ECUs can avoid the shortage in power feed to the load by controlling the power generation device 40*a* by using the reference power generation amount, which can be acquired by the host control unit, or by using the held maximum power generation amount.

The power generation control system 70 according to the present embodiment includes the power generation devices 40*a* and 40*b* configured to generate electrical power by using the engines 44*a* and 44*b* based on a target power generation amount, and to supply the generated electrical power to a load (i.e., rotors 20 and 29), the flight controllers 92*a* and 92*b* configured to decide a target power feed amount, which represents an electrical power amount to be supplied to the load, based on a state of the load, and the control sections 91*a* and 91*b* configured to control the power generation devices 40*a* and 40*b* by evaluating the reliability of the target power generation amount, selecting a calculation method of the target power generation amount based on a result of the evaluation, and calculating the target power generation amount by using the target power feed amount decided by the flight controllers 92*a* and 92*b* according to the calculation method. In this way, the control sections 91*a* and 91*b* evaluate the reliability of the target power generation amount and select the calculation method (i.e., control mode) of the target power generation amount based on a result of the evaluation, thereby calculating the target power generation amount by using the target power feed amount decided by the flight controllers 92*a* and 92*b* according to an appropriate calculation method corresponding to the reliability of the target power generation amount. As a result, it is possible to appropriately control the power generation device without shortage in power feed even when the reliability is lowered.

In addition, the control section 91*a*, 91*b* is configured to evaluate the reliability of the target power generation amount by receiving the target power generation amount calculated by the other control section from the other control section. In this way, even when the other control section fails and the target power generation amount cannot be received from the other control section, it is possible to select an appropriate calculation method of a target power generation amount according to the reliability, and to stably control the power generation device, based on the target power generation amount.

In addition, the ECUs 41$a_0$ and 44$a_0$ and the ECUs 41$b_0$ and 44$b_0$ are configured to evaluate the reliability of the target power generation amount by not receiving the target power generation amount from any of the control sections 91*a* and 91*b*. In this case, the ECUs select the fail control mode 2 or 3. In this way, even when both the control sections 91*a* and 91*b* fail and the target power generation amounts cannot be received from the control sections, the ECUs 41$a_0$ and 44$a_0$ and the ECUs 41$b_0$ and 44$b_0$ can select an appropriate calculation method of a target power generation amount according to the reliability, and stably control the power generation devices 40*a* and 40*b*, based on the target power generation amount.

A power generation control method according to the present embodiment includes steps of evaluating reliability of a target power generation amount that is used by the power generation devices 40*a* and 40*b* configured to generate electrical power by using the engines 44*a* and 44*b* and to supply the generated electrical power to a load (rotors 20 and 29), selecting a calculation method of a target power generation amount based on a result of the evaluation, and controlling, by the control sections 91*a* and 91*b*, the power generation devices 40*a* and 40*b* by calculating a target power generation amount by using a target power feed amount, which represents an electrical power amount to be supplied to the load and is decided based on a state of the load by the flight controllers 92*a* and 92*b*, according to the calculation method. In this way, the reliability of the target power generation amount is evaluated and a calculation method (i.e., control mode) of a target power generation amount is selected based on a result of the evaluation, so that a target power generation amount is calculated using a target power feed amount decided by the flight control sections 92*a* and 92*b* according to an appropriate calculation method corresponding to the reliability of the target power generation amount. As a result, it is possible to appropriately control the power generation device without shortage in power feed even when the reliability is lowered.

Further, in the evaluation step, the control section 91*a*, 91*b* evaluates the reliability of the target power generation amount by receiving the target power generation amount calculated by the other control section from the other control section. Even when the other control section fails and the target power generation amount cannot be received from the other control section, it is possible to select an appropriate calculation method of a target power generation amount according to the reliability, and to stably control the power generation device, based on the target power generation amount.

Also, in the evaluation step, the ECUs 41$a_0$ and 44$a_0$ and the ECUs 41$b_0$ and 44$b_0$ evaluate the reliability of the target power generation amount by not receiving the target power generation amount from any of the control sections 91*a* and 91*b*. In this case, the ECUs select the fail control mode 2 or 3. In this way, even when both the control sections 91*a* and 91*b* fail and the target power generation amounts cannot be received from the control sections, the ECUs 41$a_0$ and 44$a_0$ and the ECUs 41$b_0$ and 44$b_0$ can select an appropriate calculation method of a target power generation amount according to the reliability, and stably control the power generation devices 40*a* and 40*b*, based on the target power generation amount.

Note that, in the aircraft 100 according to the present embodiment, the two sets of engines 44*a* and 44*b*, motor generators 42*a* and 42*b*, and PCUs 41*a* and 41*b* are provided. However, any number of power generation devices may be provided, such as one set or three or more sets of engines 44*a* and 44*b*, motor generators 42*a* and 42*b*, and PCUs 41*a* and 41*b*.

While the embodiments of the present invention have been described, the technical scope of the present invention is not limited to the above-described embodiments. It is apparent to persons skilled in the art that various alterations or improvements can be made to the above-described embodiments. It is also apparent from the description of the claims that the embodiments to which such alterations or improvements are made can be included in the technical scope of the present invention.

The operations, procedures, steps, and stages of each process performed by an apparatus, system, program, and method shown in the claims, specification, or drawings can be performed in any order as long as the order is not indicated by "prior to," "before," or the like and as long as the output from a previous process is not used in a later process. Even if the process flow is described using phrases such as "first" or "next" in the claims, specification, or drawings, it does not necessarily mean that the process must be performed in this order.

What is claimed is:

1. A power generation control system comprising:
a power generation device configured to generate electrical power by using an engine, based on a target power generation amount, and to supply the generated electrical power to a load;
a first determination unit configured to decide a target power feed amount, which represents an electrical power amount to be supplied to the load, based on a state of the load;
a first control section configured to control the power generation device by evaluating reliability of the target power generation amount, selecting a calculation method of the target power generation amount based on a result of the evaluation, and calculating the target power generation amount by using the target power feed amount decided by the first determination unit according to the calculation method;
a second determination unit configured to decide a target power feed amount, which represents an electrical power amount to be supplied to the load, based on a state of the load, independently of the first determination unit; and
a second control section configured to control the power generation device by calculating the target power generation amount by using the target power feed amount decided by the second determination unit, wherein
the first control section is configured to evaluate the reliability of the target power generation amount by receiving the target power generation amount calculated by the second control section from the second control section.

2. The power generation control system according to claim 1, wherein
the first control section is configured to select a normal control mode by receiving the target power generation amount from the second control section when evaluating the reliability of the target power generation amount, and to calculate the target power generation amount by using at least one of the target power feed amount decided by the first determination unit and the target power feed amount decided by the second determination unit in the normal control mode.

3. The power generation control system according to claim 1, wherein
the first control section is configured to select a fail control mode 1 by not receiving the target power generation amount from the second control section when evaluating the reliability of the target power generation amount, and to calculate the target power generation amount by using the target power feed amount decided by the first determination unit and a reference power generation amount in the fail control mode 1.

4. The power generation control system according to claim 2, wherein
the first control section is configured to select a fail control mode 1 by not receiving the target power generation amount from the second control section when evaluating the reliability of the target power generation amount, and to calculate the target power generation amount by using the target power feed amount decided by the first determination unit and a reference power generation amount in the fail control mode 1.

5. The power generation control system according to claim 1, wherein
the first control section is further configured to evaluate the reliability of the target power generation amount, depending on whether the target power generation amount calculated by the first control section matches the target power generation amount received from the second control section.

6. The power generation control system according to claim 1, further comprising a battery configured to store electrical power that is supplied from the power generation device, and to supply the stored electrical power to the load, wherein
the first control section is configured to calculate the target power generation amount by additionally using a state of charge of the battery.

7. The power generation control system according to claim 2, further comprising a battery configured to store electrical power that is supplied from the power generation device, and to supply the stored electrical power to the load, wherein
the first control section is configured to calculate the target power generation amount by additionally using a state of charge of the battery.

8. The power generation control system according to claim 6, wherein
the first control section is configured to decide a target charge amount, which represents an electrical power amount to be charged based on the state of charge of the battery, and to calculate the target power generation amount by additionally using the target charge amount.

9. The power generation control system according to claim 6, wherein the power generation device comprises a control unit configured to control power generation based on the target power generation amount, and
the control unit is configured to receive the target power generation amount from the first control section, to evaluate the reliability of the target power generation amount, and to use the received target power generation amount or to newly calculate a target power generation amount based on a result of the evaluation.

10. The power generation control system according to claim 9, wherein
the control unit is configured to select a normal control mode or a fail control mode 1 by receiving the target power generation amount from the first control section when evaluating the reliability of the target power generation amount, and to use the received target power generation amount in the normal control mode or the fail control mode 1.

11. The power generation control system according to claim 10, wherein
the control unit is configured to receive the target power generation amount from the second control section, in response to not receiving the target power generation amount from the first control section, and to use the target power generation amount received from the second control section.

12. The power generation control system according to claim 9, wherein
the control unit is configured, when evaluating the reliability of the target power generation amount, to select a fail control mode 2 or a fail control mode 3, if the target power generation amount is not received from any of the first control section and the second control section.

13. The power generation control system according to claim 10, wherein
the control unit is configured, when evaluating the reliability of the target power generation amount, to select a fail control mode 2 or a fail control mode 3, if the target power generation amount is not received from any of the first control section and the second control section.

14. The power generation control system according to claim 12, wherein
the control unit is configured, when evaluating the reliability of the target power generation amount, to select the fail control mode 2 if the state of charge of the battery is equal to or larger than a certain amount, and to decide the target power generation amount by using a reference power generation amount in the fail control mode 2.

15. The power generation control system according to claim 12, wherein
the control unit is configured, when evaluating the reliability of the target power generation amount, to select the fail control mode 3 if the state of charge of the battery is less than a certain amount, and to use a maximum power generation amount that can be generated, as the target power generation amount in the fail control mode 3.

16. The power generation control system according to claim 14, wherein
the control unit is configured, when evaluating the reliability of the target power generation amount, to select the fail control mode 3 if the state of charge of the battery is less than a certain amount, and to use a maximum power generation amount that can be generated, as the target power generation amount in the fail control mode 3.

17. An aircraft comprising the power generation control system according to claim 1, wherein
the load is a propulsion system configured to generate a propulsive force for flying.

* * * * *